United States Patent [19]

Perryman et al.

[11] Patent Number: 5,005,099

[45] Date of Patent: Apr. 2, 1991

[54] METHOD AND APPARATUS FOR THE PREVENTION OF FAST-FORWARDING OF A VIDEO CASSETTE TAPE

[76] Inventors: James D. Perryman, 1449 Richland Rd. #9, Auburn, Ala. 36830; John M. Green, 125 Eufaula St., Gulf Breeze, Fla. 32561

[21] Appl. No.: 451,562

[22] Filed: Dec. 18, 1989

[51] Int. Cl.⁵ .................. G11B 23/02; G11B 15/48
[52] U.S. Cl. ................... 360/132; 360/74.1; 360/74.6
[58] Field of Search .............. 360/71, 74.1, 74.2, 360/74.6, 132

[56] References Cited

U.S. PATENT DOCUMENTS 4,400,745 8/1983 Shu ........................ 360/71 X

Primary Examiner—A. J. Heinz
Attorney, Agent, or Firm—John K. Donaghy

[57] ABSTRACT

This invention relates to a method and apparatus for preventing the fast-forwarding of a video tape cassette through a commercial advertisement recorded at the beginning of the tape. The methods disclosed make use of the standard photoelectric circuitry normally built into a video cassette recorder for sensing the transparent ends of a tape and stopping the recorder. Actuation of the standard stop circuitry may be accomplished by adding an auxiliary light source and associated operating circuitry to illuminate the photocell thereof.

4 Claims, 2 Drawing Sheets

METHOD AND APPARATUS FOR THE PREVENTION OF FAST-FORWARDING OF A VIDEO CASSETTE TAPE

BACKGROUND OF THE INVENTION:

1. Field of the Invention:

The popularity and proliferation of video cassette recorders (VCR's) over the last few years has brought about many changes in the marketing of movies and video tape copies thereof. One recent innovation is the subsidization of the relatively high price of a video tape of a recent hit movie by advertising companies who add a commercial to the tape so that the consumer must view the commercial each time the tape is viewed.

Since every VCR has a fast-forward mode of operation, and it is not uncommon for a consumer who has purchased one of these subsidized tapes to fast-forward through the commercial segment, which is usually at the beginning of the tape, thus defeating the advertiser's attempt to force the consumer to watch the commercial each time the tape is played.

2. Background of the Prior Art:

We are aware of no prior art which discloses a function similar to that provided by the instant invention.

SUMMARY OF THE INVENTION

In order to prevent fast-forwarding of the tape through the commercial segment by the consumer, we have developed a method of activating the standard photoelectric circuitry associated with all VCR's for detecting the ends of the tape, thus causing the VCR to stop whenever the fast-forward mode is engaged during the commercial.

The standard photoelectric circuitry associated with VCR's is illustrated in the prior art patent to H. Umeda, U.S. Pat. No. 4,091,426, issued May 23, 1978. A transparent leader is placed at the beginning and end of each video tape cassette, and each VCR has photoelectric sensing circuits for determining when one of these transparent leaders is reached, and causing the VCR to stop, regardless of the mode of operation at the time.

The usual practice is to provide a light source located within a centrally located aperture in the video tape cassette, with the light source generating two light paths through the cassette to two photocells, one mounted at each side of the cassette. These light paths are arranged to pass through the video tape as it is wound on or off each reel. The transparent leaders at the beginning and end of each tape will allow completion of the light path from the source to the photocell, thus causing activation of the photocell circuitry and stopping of the VCR. Alternatively, the recorded portion of the tape is coated with a magnetic oxide and is opaque, blocking the light path as the tape passes between the light source and the photocell during normal play.

The method of the invention is to utilize this photoelectric circuitry already present in a VCR to prevent fast-forwarding through the commercials at the beginning of the tape. Since the commercial is a recorded part of the tape, it is opaque, so the photoelectric stop circuitry must be activated by an additional light source.

We accomplish the method of the invention in two different ways: (1) a tape guide arm is spring-biased against the video tape to sense the tension on the tape, with increasing tension indicating fast-forward operation; this increased tension causes the closing of a pair of electrical contacts, which connects an auxiliary light source to an associated battery, with the light source positioned to illuminate a photocell associated with the photoelectric stop circuitry, and stop the VCR; and (2) a generator and light source are associated with one of the tape reels of the cassette; when the speed of the generator is increased in the fast-forward mode, the generator will produce enough voltage to illuminate the light source, which will shine on the photocell and activate the photoelectric stop circuitry to stop the VCR.

DESCRIPTION OF THE PREFERRED EMBODIMENTS

Figure 1:
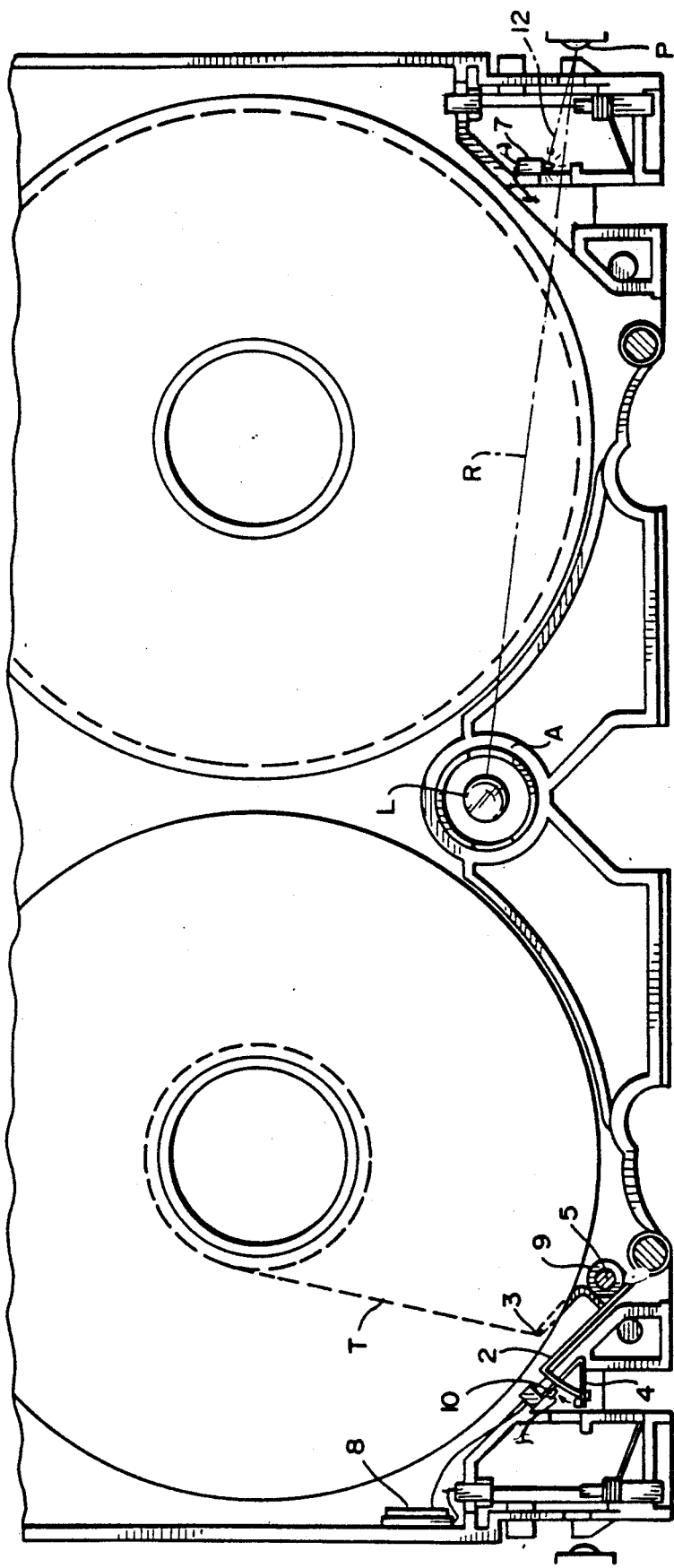
FIG. 1 is a top elevational view of a first embodiment of the invention.

Referring to FIG. 1, a top elevational view of a video tape cassette is shown, with the top surface removed to reveal the elements inside, illustrating the first embodiment of the invention. The standard photoelectric circuitry of a conventional video cassette recorder includes a light source L which resides within aperture A of the cassette during normal operation. A light path or ray R shines across the path of tape T such that the transparent leaders on the ends of the tape can be sensed when the light ray R reaches photocell P, and the recorder can be stopped.

This first embodiment senses the increase in the tension which occurs in tape T during fast-forward operation. A pivoting arm 2 is rigidly attached to smooth guide pin 3 which is in continuous contact with tape T. The tape is held in an angular path around pin 3 by resilient spring member 4. Increased tension on tape T will pivot arm 2 into contact with switch contacts 10, closing the circuit which includes lamp 7 and battery 8. Illumination of lamp 7 creates a light path 12 to photocell P, and the recorder is stopped.

In conventional cassettes, post 5 mounts a rotating hard plastic sleeve 9 which acts as a tape guide. In the present invention, post 5 serves as a pivot for guide pin 3 and pivoting arm 2, which are attached to sleeve 9.

The length of the arm supporting guide pin 3 and the number of degrees through which it rotates under tension will determine the number of minutes of initial tape play that the prevention of fast-forward operation will be effective. Thus, these variables will be determined at the time of manufacture of the cassette based on the length of the commercial being added to the tape.

Figure 2:
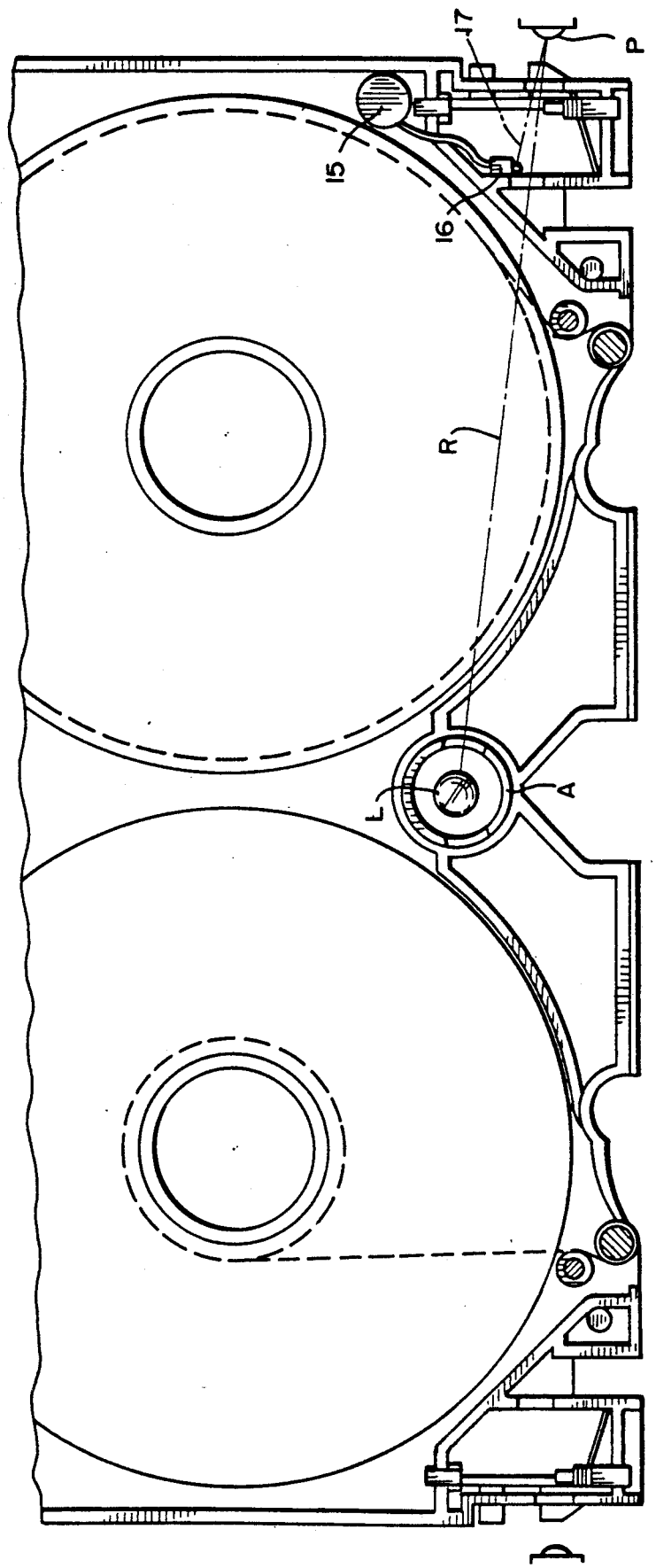
FIG. 2 is a top elevational view of a second embodiment of the invention.

The second embodiment of the invention is illustrated in FIG. 2. In this embodiment, an electrical direct current generator 15 is adapted to be driven by one of the tape reels by any suitable means. The generator is connected to an auxiliary light source 16 which will create an auxiliary light path 17 to photocell P when it is illuminated. To prevent fast-forward operation, the voltage developed by generator 15 is selected such that it will be sufficient to activate light 16 only when it is being driven at fast-forward speed. A diode (not shown) may be added to the light circuit to preclude activation of the prevention circuitry during rewinding of the tape. Additionally, the physical elements of the generator may be built into the tape reel itself, thus eliminating the addition of other moving parts to the cassette.

This detailed description of the preferred embodiments of the present invention and the specific apparatus described herein may of course be modified or changed in the design, construction or specific materials thereof without departing from the spirit and scope of the invention, which is limited only by the appended claims.

What is claimed is:

1. In a video cassette recorder having a motor for driving the supply reel and take-up reel for moving a video tape in a video tape cassette at a first play/record speed and a second fast forward/rewind speed, and standard photoelectric circuitry for sensing the clear leader and trailer in a video tape cassette to stop said recorder when the beginning or end of said tape is reached, a method for preventing the fast-forwarding of said video tape cassette in said video cassette recorder comprised of sensing said second speed of said tape in said cassette, and activating said standard photoelectric circuitry of said video cassette recorder for sensing the end of said tape to cause said video cassette recorder to stop.

2. In a video cassette recorder having a motor for driving the supply reel and take-up reel for moving a video tape in a video tape cassette at a first play/record speed and a second fast forward/rewind speed, and standard photoelectric circuitry for sensing the clear leader and trailer in a video tape cassette to stop said recorder when the beginning or end of said tape is reached, apparatus for preventing the fast-forwarding of said video cassette recorder wherein:

the speed of the tape in said cassette is sensed by means for sensing the tension on said tape, and when said sensed speed is indicative of the fast-forward mode of operation, causing activation of said standard photoelectric circuitry for sensing the end of said tape to cause said video cassette recorder to stop.

3. Apparatus as claimed in claim 2, wherein said means for sensing the tension on said tape includes a pivotally mounted tape guide spring-biased to ride against said tape, said tape guide positioned to press against and close a set of electrical contacts when said tape tension reaches a level associated with fast-forwarding operation, which excessive tension is indicative of fast-forward operation, said contacts upon closing causing connection of a lamp to a battery for illumination of said standard photocell circuitry for sensing the end of said tape, to cause said video cassette recorder to stop.

4. Apparatus as claimed in claim 2, wherein:

an electrical generator is adapted to be driven by one of said reels of said video tape recorder the voltage generated by said generator during fast-forward operation of said video cassette recorder being sufficient to illuminate a light source connected to said generator which then illuminates the photocell of said standard photoelectric circuitry for sensing the end of said tape to cause said video cassette recorder to stop.

* * * * *